United States Patent Office 3,424,792
Patented Jan. 28, 1969

3,424,792
**ISOMERIC MIXTURES OF METHYLCYCLO-
HEXYLENE DIAMINE**
James M. Cross, New Martinsville, W. Va., assignor to
Mobay Chemical Company, Pittsburgh, Pa., a corporation of Delaware
No Drawing. Continuation-in-part of applications Ser.
No. 523,569, Jan. 28, 1966, and Ser. No. 614,395,
Feb. 2, 1967. This application June 12, 1967, Ser. No.
645,476
U.S. Cl. 260—563                                  6 Claims
Int. Cl. C07c 87/36

ABSTRACT OF THE DISCLOSURE

Methylcyclohexylene diamines are prepared by hydrogenating tolylene diamines. Methylcyclohexylene diamines are prepared wherein from about 85 percent to about 95 percent of the isomer has the amino groups in the equatorial position, that is, the $ee$ conformation and about 5 percent to about 15 percent of the isomer has the amino groups in the axial-equatorial positions, that is, the $ae$ conformation; where $a$ indicates axial and the letter $e$ indicates equatorial. The corresponding diisocyanates are prepared by phosgenating the above-described amines.

---

This application is a continuation-in-part of copending applications Ser. Nos. 523,569 filed Jan. 28, 1966, and 614,395 filed Feb. 2, 1967.

This invention relates to methylcyclohexylene diamines and methylcyclohexylene diisocyanates as new compositions of matter and more particularly to certain isomeric mixtures of methylcyclohexylene diamine and the corresponding diisocyanates having the formula

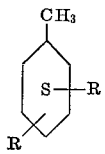

wherein R is $NH_2$ or NCO.

Methylcyclohexylene diamines can be prepared by hydrogenating tolylene diamine. Thus, to prepare the 2,4-isomer, for example, 2,4-tolylene diamine is hydrogenated. In the same fashion, if an isomeric mixture of 80 percent 1-methyl-2,4-cyclohexylene diamine and 20 percent 1-methyl-2,6-cyclohexylene diamine is desired, the corresponding tolylene diamine isomeric mixture is hydrogenated. Many and various techniques known in the hydrogenation art can be used in the conversion of tolylene diamine to methylcyclohexylene diamine.

It is an object of this invention to provide methylcyclohexylene diamines having a given and desired conformation. It is another object of this invention to prepare methylcyclohexylene diamines which are particularly suitable for phosgenation to the corresponding isocyanates. It is a further object of this invention to provide methylcyclohexylene diamines wherein the diequatorial conformation is predominant. It is another object of this invention to provide 1-methyl-2,4-cyclohexylene diamines wherein the amino groups are predominantly in the equatorial position. It is still another object of this invention to provide isomeric mixtures in methylcyclohexylene diamine containing about 80 percent of the 2,4-isomer and 20 percent of the 2,6-isomer, the amino groups of which are predominantly in the equatorial position. It is another object of this invention to provide methylcyclohexylene diisocyanates having a given and desired conformation.

The foregoing objects and others which will become apparent from the following description are accomplished in accordance with the invention, generally speaking, by providing methylcyclohexylene diamines and methylcyclohexylene diisocyanates having an equatorial-equatorial conformation content of from about 85 to about 95 percent and an axial-equatorial conformation content of from about 5 to about 15 percent.

When an aromatic compound such as benzene, toluene and the like is hydrogenated to produce a cycloaliphatic compound, the molecule which is generally considered planar when in the aromatic form assumes a different molecular configuration which is generally depicted as a chair.

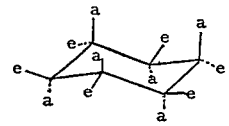

While a second configuration known as the boat form also can be formed, the chair structure is generally greatly predominant. In cyclohexane, the bonds joining the hydrogen atoms to each carbon atom of the ring lie either substantially in the plane of the molecule or substantially perpendicular of the plane of the molecule. The bonds substantially within the plane of the molecule are called "equatorial" and are shown above by the letter $e$. The bonds substantially perpendicular to the plane of the molecule are called "axial" and are shown above by the letter $a$. The alternate axial bonds are on opposite sides of the plane of the molecule while the alternate equatorial bonds are substantial within the plane but at slight opposite angles wtih respect to the plane.

Thus, each carbon atom of cyclohexane contains two bonds, one being substantially perpendicular to the plane of the molecule and the other substantially within the plane of the molecule. The molecule contains three axial bonds on either side of the plane on alternate carbon atoms. This presents the possibility of having geometric isomers when two of the hydrogen atoms on the cyclohexane ring are replaced by other substituents such as amino groups. These geometric isomers are referred to as cis and trans isomers.

When 2,4-tolylene diamine is fully hydrogenated the resulting compound is 2,4-methylcyclohexylene diamine, This compound when prepared by reduction at elevated temperatures as specified below is comprised of the cis isomer with both amino groups occupying equatorial positions. The reduced mixture has a cis isomer content of 85 to 95 percent. The other 5 to 15 percent of the reduced mixture is the trans isomer in which one amino substituent occupies an equatorial position and the other amino substituent occupies an axial position. Both the cis and trans isomers exist as racemic modifications. Both the levo and dextro optical isomers have the same chemical reactivity.

When 2,6-tolylene diamine is fully hydrogenated the resulting compound is 2,6-diamino methylcyclohexylene diamine. This compound when prepared by reduction at elevated temperatures as specified below is comprised of the cis isomer with both amino groups occupying equatorial positions. The reduced mixture has a cis isomer content of 85 to 95 percent. The other 5 to 15 percent of the reduced mixture is the trans isomer in which one amino substituent occupies an equatorial position and the other amino substituent occupies an axial position. The trans isomer exists as a racemic modification. The cis isomer, however, exists in the meso form. The optical characteristics of these isomers do not affect the chemical reactivity of the mixture.

In order to achieve isomeric structures having essentially ee conformations as described above, it is necessary to heat the hydrogenation vessel to a temperature in excess of 200° C. and preferably at a temperature of from about 240° C. to about 260° C. This is true regardless of the catalyst that is used in the preparation. When temperatures below about 200° C. are utilized, too much undesired ae isomer is obtained; that is, one of the amino groups that is bonded to a carbon atom in the cyclohexane ring is substantially perpendicular to the plane of the molecule. When this condition occurs, the amino group positioned in the axial position is very difficult to phosgenate and obtain the diisocyanate. That is, the physical dimensions of the NCO groups are so large that they do not fit readily into the molecule.

In the preparation of the diamine compositions in accordance with this invention, the tolylene diamine used as the starting material, which will generally be either 2,4-tolylene diamine or an isomeric mixture of 2,4- and 2,6-tolylene diamine present in either a ratio of 80:20 or 65:35 respectively, is heated in a pressure vessel maintained at a pressure of from about 2,000 to about 10,000 pounds per square inch gauge at a temperature of at least 200° C. The pressure is maintained by the introduction of hydrogen. Any suitable hydrogenation catalysts may be used in a catalytic amount to bring about the conformation in accordance with this invention such as, for example, platinum, palladium, nickel, Raney nickel, rhodium, ruthenium, copper, iron, chromium, molybdenum, tungsten, cobalt, and oxides, sulfides and the like. It is preferred to use a catalyst composition comprising a mixture of cobalt oxide, calcium oxide and sodium carbonate in the ratio of from about 1:1.4:6 to about 1:1.6:7 and preferably in the ratio of about 1:1.5:0.65. Regardless of the catalyst used it should be present in a catalytic amount and the particular cobalt catalyst mentioned above should preferably be present in an amount from about 2.5 to about 5 percent by weight of the toluene diamine present. When more active catalysts such as ruthenium dioxide are used they must be present in small quantities because of their activity. If present in larger quantities it is difficult, if not impossible, to reach the temperatures necessary to achieve the predominant ee conformation desired in accordance with this invention without the occurrence of side reactions.

The diamine compositions in accordance with this invention find utility in many applications wherein diamines are used. For example, they may be used as curing agents for epoxy resins, as intermediates in the preparation of other materials and in the preparation of the corresponding isocyanates by phosgenation of the amine.

The isocyanates having the conformations set forth above are obtained by phosgenation of the methylcyclohexylene diamines in a suitable solvent. Preferably, the amine is converted to the salt form by passing $CO_2$ through the stirred solution until the exotherm is substantially complete. The phosgene is passed through the amine solution in an excess amount and preferably in solution of the same solvent. A moderate purge of phosgene is maintained on the reaction mixture and later slowly heated to reflux with stirring. The unreacted phosgene is removed and the product worked up by distillation.

As stated above, too much equatorial-axial conformation of methylcyclohexylene diamine is not suitable for the preparation of the isocyanate because of the physical make-up of the molecule. The ee conformation with no more than 15 percent of the ae conformation is desired for the production of the corresponding diisocyanate which have the same conformation as the methylcyclohexylene diamines. The isocyanate is prepared by the phosgenating of the corresponding amine or isomeric mixture of amines by techniques generally known in the art.

The invention will be further illustrated by the following examples in which parts are by weight unless otherwise specified.

Example 1

Into a stainless steel autoclave equipped with a stirrer, a heating coil and a source of hydrogen, is charged about 1,000 parts of an isomeric mixture of 80 percent 2,4- and 20 percent 2,6-tolylene diamine heated to a temperature of about 90° C. and about 157.5 parts of a catalytic mixture containing 50 parts of cobalt oxide ($CO_2O_3$), 75 parts of calcium oxide (CaO), and about 32.5 parts of sodium carbonate ($Na_2CO_3$). The autoclave is closed, heated to from about 90° to about 100° C. and stirring is commenced. Nitrogen at a pressure of about 50 p.s.i.g. is introduced and vented to 0 gauge reading three times. Hydrogen is introduced at about 200 p.s.i.g. and vented to 0 gauge reading five times. The autoclave is then heated to about 250° C. and hydrogen is introduced to a pressure of about 3,000 p.s.i.g. The autoclave is isolated from the hydrogen source and each time the pressure within the autoclave drops to 2,500 p.s.i.g. it is reestablished to 3,000 p.s.i.g. This procedure enables the observance of the amount of hydrogen consumed. After four hours the product is removed from the autoclave and analyzed. The product contains about 82 percent methylcyclohexylene diamine isomers in a ratio of 80 percent 2,4- and 20 percent 2,6- and 5.3 percent methylcyclohexylene amines, about 2.4 percent toluidines and about 9.9 percent unreduced tolylene diamines. This represents a yield of about 90.3 percent of theory. The product removed from the autoclave is worked up by distillation to separate the by-products from the methylcyclohexylene diamines. This product contains about 91 percent of the ee conformation and 9 percent of the ae conformation as determined by vapor phase chromatography.

Example 2

The procedure of Example 1 is conducted with the exception that in place of the isomeric mixture of tolylene diamine charged to the autoclave, about 1,000 parts of 2,4-tolylene diamine is charged. The reaction conditions of Example 1 are followed and the product removed from the autoclave contains about 84 percent 1-methyl-2,4-cyclohexylene diamine, about 5 percent methylcyclohexylene amines, about 3.2 percent toluidines, and about 7.8 percent unreduced 2,4-tolylene diamine. This represents a yield of about 90 percent of theory. The desired product is obtained by removing the unwanted side reaction products by distillation and contains about 86 percent of the ee conformation and 14 percent of the ae conformation.

Example 3

Example 1 is again repeated, however, the reduction is continued for 6 hours and 40 minutes at 250° C. rather than 4 hours. Upon removing the product from the autoclave, it is observed that an increase in the amount of methylcyclohexylene amines occurs. While an increase in by-product is observed, the main product contains about 94 percent of the ee conformation and 6 percent of the ae conformation.

Example 4

Example 2 is repeated, however, the pressure is maintained at 4,000 p.s.i.g. initial and permitted to drop to 3,500. The product contains about 78 percent 1-methyl-2,4-cyclohexylene diamine, about 2.66 percent methylcyclohexylene amines, about 1.09 percent toluidines, about 16 percent unreduced 2,4-tolylene diamines. This represents a yield of about 95 percent and contains about 89 percent of the ee conformation and 11 percent of the ae conformation.

Example 5

Into the autoclave of Example 1 is charged about 195 parts of an isomeric mixture of 80 percent 2,4-tolylene diamine and 20 percent 2,6-tolylene diamine and about 1 part of $RuO_2$-$XH_2O$ having a $RuO_2$ content of about 58 percent. The autoclave is purged as in Example 1 and then heated to about 250° C. under a hydrogen pressure of 4,000 p.s.i.g. for one hour. The yield of methylcyclohexylene diamine is about 50 percent and contains about 90 percent of the *ee* conformation and 10 percent of the *ae* conformation.

Example 6

Carbon dioxide is introduced beneath the surface of a 12 to 15 percent solution of the isomeric mixture of methylcyclohexylene diamine prepared according to Example 1 for four hours with constant stirring. At this time the salt formation is substantially complete as indicated by completion of the exotherm and a pH of 8.5 to 9. The amine salt slurry is slowly added with stirring to a solution of phosgene in monochlorobenzene. The phosgene solution is prepared so a 50 to 100 percent theoretical excess of phosgene is contained in sufficient monochlorobenzene to produce a final solvent to amine ratio of about 20 to 1. As the salt slurry causes a slight exotherm upon addition to the phosgene solution, the rate of addition is controlled to prevent a rise in temperature above about 20° C. The resulting slurry is stirred at ambient temperatures for 1–2 hours with a purge of about 49 parts per hour of phosgene introduced beneath the surface. The reaction mass is permitted to stand overnight and then heated to reflux over a period of 1–2 hours with a purge of about 49 parts per hour of phosgene being introduced. The reaction mixture is held at reflux with stirring until it clears and then for an additional hour to insure completion of the reaction. The unreacted phosgene is removed by purging with $N_2$ for one hour at reflux and the majority of solvent is removed by distillation until the temperature reaches about 140° C. Isolation of the product is accomplished by flash distilling from chlorinated biphenyl at 50 mm. Hg. and 160° C. followed by fractional distillation of the distillate. The yield of methylcyclohexylene diisocyanate is about 85 percent and is established by Vapor Phase Chromotography to contain about 91 percent of the *ee* conformation and 9 percent of the *ae* conformation.

It is to be understood that any of the different positional isomers or mixtures of tolylene diamines may be used as starting material to produce the cycloaliphatic diamines and diisocyanate in the preceding examples and the examples are given for the purpose of illustration and not limitation.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. As a composition of matter a compound having the formula

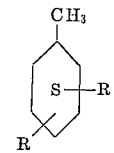

wherein R is $NH_2$, from about 85 percent to about 95 percent of the isomers present having the *ee* conformation and about 5 to about 15 percent having the *ae* conformation.

2. The composition of claim 1 wherein the methylcyclohexylene diamine is 1-methyl-2,4-cyclohexylene diamine.

3. The composition of claim 2 wherein the 1-methyl-2,4-cyclohexylene diamine is a racemic modification.

4. The composition of claim 1 wherein the methylcyclohexylene diamine is an isomeric mixture of 1-methyl-2,4-cyclohexylene diamine and 1-methyl-2,6-cyclohexylene diamine.

5. The composition of claim 4 wherein the 2,4-isomer is present in an amount of about 80 percent and the 2,6-isomer present in an amount of about 20 percent.

6. The composition of claim 4 wherein the 2,4-isomer is present in an amount of about 65 percent and the 2,6-isomer present in an amount of about 35 percent.

References Cited

UNITED STATES PATENTS 3,351,650  11/1967  Cross.

CHARLES B. PARKER, *Primary Examiner.*

D. H. TORRENCE, *Assistant Examiner.*

U.S. Cl. X.R.

260—453, 2, 47